(12) United States Patent
Rusko

(10) Patent No.: US 10,548,331 B2
(45) Date of Patent: Feb. 4, 2020

(54) DEVICE AND METHOD FOR REMOVING PIN BONES FROM A FISH FILLET

(71) Applicant: NORDISCHER MASCHINENBAU RUD. BAADER GMBH + CO. KG, Luebeck (DE)

(72) Inventor: Torsten Rusko, Herrnburg (DE)

(73) Assignee: NORDISCHER MASCHINENBAU RUD. BAADER GMBH + CO. KG, Lübeck (DE)

( * ) Notice: Subject to any disclaimer, the term of this patent is extended or adjusted under 35 U.S.C. 154(b) by 0 days.

(21) Appl. No.: 16/312,472

(22) PCT Filed: Jun. 6, 2017

(86) PCT No.: PCT/EP2017/063716
§ 371 (c)(1),
(2) Date: Dec. 21, 2018

(87) PCT Pub. No.: WO2018/001683
PCT Pub. Date: Jan. 4, 2018

(65) Prior Publication Data
US 2019/0124937 A1 May 2, 2019

(30) Foreign Application Priority Data
Jun. 30, 2016 (EP) .................................... 16177143

(51) Int. Cl.
*A22C 25/00* (2006.01)
*A22C 25/16* (2006.01)
*A22C 25/08* (2006.01)

(52) U.S. Cl.
CPC ............ *A22C 25/166* (2013.01); *A22C 25/08* (2013.01); *A22C 25/16* (2013.01)

(58) Field of Classification Search
CPC ....................................................... A22C 25/00
(Continued)

(56) References Cited

U.S. PATENT DOCUMENTS 5,525,101 A 6/1996 Soderlind
6,322,437 B1* 11/2001 Grabau .................. A22C 25/16
452/161

(Continued)

FOREIGN PATENT DOCUMENTS

CN    102984947     3/2013
EP    1 237 416     9/2002
(Continued)

OTHER PUBLICATIONS

PCT Search Report and Written Opinion issued in PCT/EP2017/063716.
(Continued)

*Primary Examiner* — Richard T Price, Jr.
(74) *Attorney, Agent, or Firm* — Greenblum & Bernstein, P.L.C.

(57) ABSTRACT

Apparatus for removing pin bones from fish fillets includes at least one pin bone removal device and a conveying device configured to convey the fish fillets past the at least one pin bone removal device. The pin bone removal device utilizes a rotationally driven profiled roller and a counter-bearing element. A clamping gap is formed between the rotationally driven profiled roller and the counter-bearing element. A control is configured to control a relative movement between the rotationally driven profiled roller and the counter-bearing element. The pin bone removal device is configured to grasp and remove the pin bones via tensile force from the fish fillets in the clamping gap.

26 Claims, 7 Drawing Sheets

(58) Field of Classification Search
USPC .......................... 452/135, 149–156, 160–162
See application file for complete search history.

(56) References Cited

U.S. PATENT DOCUMENTS

| | | | |
|---|---|---|---|
| 7,927,194 B2 * | 4/2011 | Jurs ..................... | A22C 25/16 |
| | | | 452/135 |
| 8,272,928 B2 * | 9/2012 | Finke ................... | A22C 25/16 |
| | | | 452/161 |
| 8,298,050 B2 * | 10/2012 | Jurs ..................... | A22C 25/16 |
| | | | 452/162 |
| 8,616,941 B2 | 12/2013 | Vahab | |
| 8,840,448 B1 | 9/2014 | Kielian | |
| 2003/0109210 A1 | 6/2003 | Jacobsen | |
| 2010/0255767 A1 * | 10/2010 | Jurs ..................... | A22C 25/16 |
| | | | 452/135 |
| 2013/0035023 A1 * | 2/2013 | Jurs ..................... | A22C 25/16 |
| | | | 452/162 |
| 2013/0059514 A1 * | 3/2013 | Jurs ..................... | A22C 25/16 |
| | | | 452/162 |
| 2013/0078898 A1 | 3/2013 | Vahab | |
| 2017/0112153 A1 | 4/2017 | Schwarz | |

FOREIGN PATENT DOCUMENTS

| | | |
|---|---|---|
| WO | 2002/076220 | 10/2002 |
| WO | 2015/150061 | 10/2015 |

OTHER PUBLICATIONS

Chinese Office Action dated Nov. 8, 2019 and issued in Chinese Application No. 201780048011.9.

\* cited by examiner

DEVICE AND METHOD FOR REMOVING PIN BONES FROM A FISH FILLET

CROSS-REFERENCE TO RELATED APPLICATIONS

The present application is a US National Stage Application of International Application No. PCT/EP2017/063716 filed Jun. 6, 2017 which published as WO 2018/001683 on Jan. 4, 2018. This application also claims the right of priority granted under 35 U.S.C. §§ 119 and 365 of European Application No. 16177143.1 filed on Jun. 30, 2016.

BACKGROUND OF THE INVENTION

1. Field of the Invention

The present invention relates to an apparatus for removing pin bones from fish fillets, comprising at least one pin bone removal device and a conveying device designed to convey the fish fillet past the at least one pin bone removal device, said pin bone removal device comprising a rotationally driven profiled roller having a counter-bearing element forming a clamping gap, the roller and the counter-bearing element being designed to grasp the pin bones in the clamping gap by clamping and to remove said bones from the fish fillets by applying tensile force.

In addition, the invention relates to a method for removing pin bones from fish fillets, comprising conveying the fish fillets on at least one pin bone removal device by way of a conveying device, grasping of the pin bones by clamping by way of the pin bone removal device in a clamping gap formed by a rotationally driven profiled roller and a counter-bearing element, applying a tensile force to the pin bones to remove said pin bones from the fish fillets.

2. Discussion of Background Information

Such apparatuses and methods are used in particular in the automatic processing of slaughtered fish. During the fish processing process or the processing of fish fillets, it is necessary to remove intermuscular or pin bones from the flesh. Document WO 02/076220 A1 already discloses an apparatus and a method for filleting slaughtered fish. The pin bones are pulled out of the fish fillets by way of a double-profiled roller by gripping or clamping them by way of the roller. The fish fillets or fish are automatically fed to the double-profiled roller by way of a conveying device.

The disadvantage is that contamination of the roller may occur when the pin bones are extracted from the flesh or fish fillet, with the result that the clamping gap formed by the roller and the counter-bearing element is obstructed. On the one hand, such contamination of the clamping or traction roller or blockages of the clamping gap mean that further removal of the pin bones is disrupted or impossible.

On the other hand, pin bones that are jammed in the clamping gap and remain there for a prolonged period may damage the fish fillet to be processed. Until the operating staff have identified the blockage of the clamping gap or jammed pin bones in the clamping gap, there is therefore a risk that either removal of the pin bones will be incomplete or it will not take place at all and/or the fish fillets will be damaged. A high reject rate is to be expected during this period. Beyond this, it is necessary to stop the entire production process during the required cleaning work. As a rule, not only is the apparatus for removing the pin bones affected by this but also any upstream and downstream production machines besides.

SUMMARY OF THE INVENTION

It is therefore the object of the present invention to propose an apparatus which guarantees highly reliable, waste-free and maintenance-free, fully automatic removal of the pin bones. The object is also to propose a corresponding method.

The object is achieved by an apparatus having the features referred to at the outset in that the counter-bearing element and the roller are designed to be controllably moved with respect to each other by a control. This has the advantage that the distance between the counter-bearing element and the roller can be enlarged temporarily by the control, in particular for cleaning purposes. Due to this enlargement of the clamping gap, pin bones or other flesh components jammed in said clamping gap are freed with the result that the clamping gap is designed to be self-cleaning. The clamping gap is thus automatically and reliably cleaned of permanently jammed pin bones and other components or contaminants and reliable removal of the pin bones is guaranteed at all times. In addition, damage to the fish fillets due to permanently jammed pin bones is also prevented in this way. A further advantage is that, due to cleaning of the clamping gap taking place continuously, contamination of the counter-bearing element and roller, which obstructs the actual process of pin bone removal, is prevented. This has a particularly advantageous effect in terms of the high requirements for hygiene in food processing.

An expedient embodiment of the invention is characterised in that the control comprise a control device having at least one actuator, wherein, by way of the at least one actuator, the control device is designed to move the counter-bearing element and the roller with respect to each other, by expanding the clamping gap, from a clamping position to a cleaning position and vice versa. It is particularly advantageous that enlargement of the clamping gap, that is moving of the counter-bearing element or roller from the clamping position to the cleaning position and vice versa, is effected by the control. In this way, cleaning of the clamping gap can be carried out by the control at any specified times. The actuator is preferably designed as a controllably configured pneumatic cylinder. Further preferably, the actuator is directly or indirectly connected to the counter-bearing element such that the actuator moves the counter-bearing element with respect to the roller. Alternatively, it is possible to arrange the actuator on the roller. In this case, the roller is designed to be movable in relation to the counter-bearing element. It is also possible to provide both the counter-bearing element and also the roller with actuators and to design each to be controllably moved.

A preferred development of the invention is characterised in that the pin bone removal device is designed to be controllably moved with respect to the conveying device by way of at least one further actuator. In other words, the pin bone removal device according to the invention is designed to be raised or lowered in relation to the conveying device.

This additional mobility in the vertical has a beneficial effect on the cleaning result of the pin bone removal device. Thus, by raising the pin bone removal device in relation to the conveying device, an additional cleaning effect can be achieved. The further actuator is preferably designed and configured as a controllable pneumatic cylinder. As the pin bone removal device is designed to be movable by way of the further actuator from a lowered position, in which the pin bone removal device is lowered so far in the direction of the conveying device that the pin bones can be removed from the fish fillets by way of said pin bone removal device, into a raised position, it is possible for the first time by using the apparatus according to the invention to initiate cleaning of the clamping gap while a portion of the relevant fish fillet is still in the area of the pin bone removal device. By bringing the pin bone removal device into the raised position, the requirement is actually created for the counter-bearing element and the roller to be moved from the clamping position to the cleaning position since, by raising the pin bone removal unit in relation to the conveying device, it comes clear of the fish fillet and thus moving the roller or the counter-bearing element with respect to each other for cleaning purposes cannot result in damage to the fish fillet that would otherwise be possible.

According to a preferred development, the distance between the pin bone removal device and the conveying device is designed to be adjustable. Thus it is possible, depending on the fish fillet to be processed, to adjust the optimum distance between the pin bone removal device and the conveying device for an ideal removal result. The free adjustability of this distance also includes being able to adjust the distance to different fish fillets during the ongoing process. Another advantage is that the setting up effort previously required when changing to fish fillets of a different batch or fish species is dispensed with, since the distance between the pin bone removal device and the conveying device is designed to be automatically adjustable by the control.

A further expedient embodiment of the invention is characterised in that the bearing force with which the pin bone removal device acts on the fish fillets is designed to be variably adjustable by the control. Advantageously, it is thus achieved that the required bearing force can be adjusted to achieve an optimum pin bone removal result. Once again, set-up times for configuring the apparatus according to the invention for different product batches are dispensed with in this case. It is further possible to adjust the bearing force during ongoing operation and in this way to achieve an optimum removal result at all times.

According to a further preferred embodiment of the invention, the control device further comprises a position determination device designed for position determination of the fish fillets conveyed past the pin bone removal device. The position determination device is preferably designed and configured as an optical sensor system, for example as a camera system with corresponding evaluation electronics or as a light barrier. By way of the position determination device, the respective position of the fish fillets conveyed past the pin bone removal device is determined or detected.

An advantageous embodiment of the invention is characterised in that the position determination device is further designed and configured to determine first points in time at which boneless areas of the fish fillets are conveyed past in the area of the clamping gap. In other words, the position determination device is not only designed and configured to determine the current position of the relevant fish fillets but beyond this can differentiate between boneless areas of the fish fillets and those with pin bones present in the flesh.

Further preferably, the position determination device is further designed and configured to determine second points in time at which the area of the clamping gap is free of fish fillets. Consequently, the position determination device is designed to track the position of each of the fish fillets. In this way, the signals or data provided for this by the position determination device supply information as to whether a fish fillet is actually located in the area of the pin bone removal device, that is in a area in front of the clamping gap, at the relevant point in time and, if this is the case, to determine whether the area of the relevant fish fillet located in each case in the area of the pin bone removal device does or does not include pin bones.

According to a further expedient embodiment of the invention, it is provided that the position determination device is designed to cause the control to transfer the counter-bearing element to the cleaning position by way of the at least one actuator within specified time intervals, at the first points in time and/or at the second points in time respectively. In other words, based on the position of the fish fillets determined by the position determination device or the corresponding first and second points in time, the at least one actuator is caused by the control to transfer the counter-bearing element or the roller to the cleaning position. Advantageously, therefore, cleaning of the clamping gap only ever takes place when none of the fish fillets is located in the area of the pin bone removal device or when a pin-boneless area passes the pin bone removal device. This offers the advantage that cleaning of the clamping gap takes place during ongoing operation and no additional time is needed for this. As a result, it is possible to free the fish fillets of the pin bones fully automatically at the highest possible conveying speed and with a resulting high throughput rate.

According to a preferred development, it is provided that the position determination device is further designed to cause the control to temporarily enlarge the distance between the conveying device and the pin bone removal device by way of the at least one further actuator within the specified time intervals, at the first points in time and/or at the second points in time respectively. As already described at the outset, this has the advantage that cleaning of the clamping gap can be initiated even if one of the fish fillets is still located in the area of the pin bone removal device. Damage to the fish fillets during the cleaning process is precluded by raising the pin bone removal device in the vertical direction with respect to the conveying device.

A further expedient embodiment of the invention is characterised in that the counter-bearing element is evasively mounted by way of the at least one actuator under application of a restoring force for clamping the pin bones. The at least one actuator thus fulfils a dual function: On the one hand, the at least one actuator is designed to move the counter-bearing element and the roller with respect to each other from the clamping position to the cleaning position and vice versa and on the other hand, the counter-bearing element is resiliently mounted via the at least one actuator. On the one hand, the resilient mounting produces the clamping force required for grasping the pin bones, on the other hand, the counter-bearing element can yield appropriately against the spring force acting when pin bones of larger diameter are drawn in. The application of a restoring force causes automatic resetting of the counter-bearing element in the direction of the roller.

According to an advantageous development of the invention, the magnitude of the restoring force applied by the control is designed to be variably adjustable. Advantageously, the clamping force with which the pin bones are grasped in the clamping gap can thus be adjusted to optimise the pin bone removal process.

According to a further advantageous embodiment, it is provided that the counter-bearing element is mounted in a floating manner. In connection with the advantages thus achieved, reference is made in the following to the corresponding passages in the description of figures in order to avoid repetition.

The object is further achieved by a corresponding method having the features referred to at the outset in that moving of the counter-bearing element and the roller with respect to each other by the control takes place in a controlled manner.

A further expedient embodiment of the invention is characterised by activation of at least one actuator by the control such that the counter-bearing element and the roller are moved with respect to each other, by expanding the clamping gap, from a clamping position to a cleaning position and vice versa.

According to a further preferred embodiment of the invention, the pin bone removal device is moved in a controlled manner with respect to the conveying device by the at least one further actuator, which is activated by the control.

An advantageous embodiment of the invention provides that the distance between the pin bone removal device and the conveying device can be preset.

According to a further preferred embodiment, a bearing force with which the pin bone removal device acts on the fish fillets is designed to be variably adjustable by the control.

The method according to the invention is further characterised by determining the position of the fish fillets conveyed past the pin bone removal device by way of a position determination device. A further expedient embodiment of the invention is characterised by determining first points in time at which boneless areas of the fish fillets are conveyed past in the area of the clamping gap. The aforementioned points in time are determined by way of the position determination device.

According to a further advantageous embodiment of the invention, second points in time at which the area of the clamping gap is free of fish fillets are determined by way of the position determination device.

According to a preferred embodiment of the invention, the counter-bearing element is caused to be moved to the cleaning position by the at least one actuator within specified time intervals, at the first points in time and/or at the second points in time respectively.

Further preferably, it is provided to temporarily enlarge the distance between the conveying device and the pin bone removal device by way of the at least one further actuator within the specified time intervals, at the first points in time and/or at the second points in time respectively.

According to an expedient development of the invention, a restoring force is applied to the counter-bearing element by the at least one actuator for clamping the pin bones such that the counter-bearing element is evasively mounted.

Further preferably, the magnitude of the restoring force applied to the counter-bearing element by the control is variably adjustable.

To avoid repetition, with regard to the advantages of the method according to the invention, reference is made to the advantages of the apparatus according to the invention mentioned above. The advantages mentioned there also apply by analogy to the method according to the invention.

According to a further advantageous embodiment of the method according to the invention, it is provided to mount the counter-bearing element in a floating manner.

BRIEF DESCRIPTION OF THE DRAWINGS

Further preferred and/or expedient features and embodiments of the invention emerge from the dependent claims and the description. Especially preferred embodiments are explained in greater detail with reference to the attached drawing. The drawing shows:

DETAILED DESCRIPTION OF THE INVENTION

In the following, the apparatus according to the invention will be explained in greater detail based on the figures referred to at the outset. To avoid repetition, the apparatus according to the invention will be explained in detail at the same time as the method according to the invention.

Figure 1:
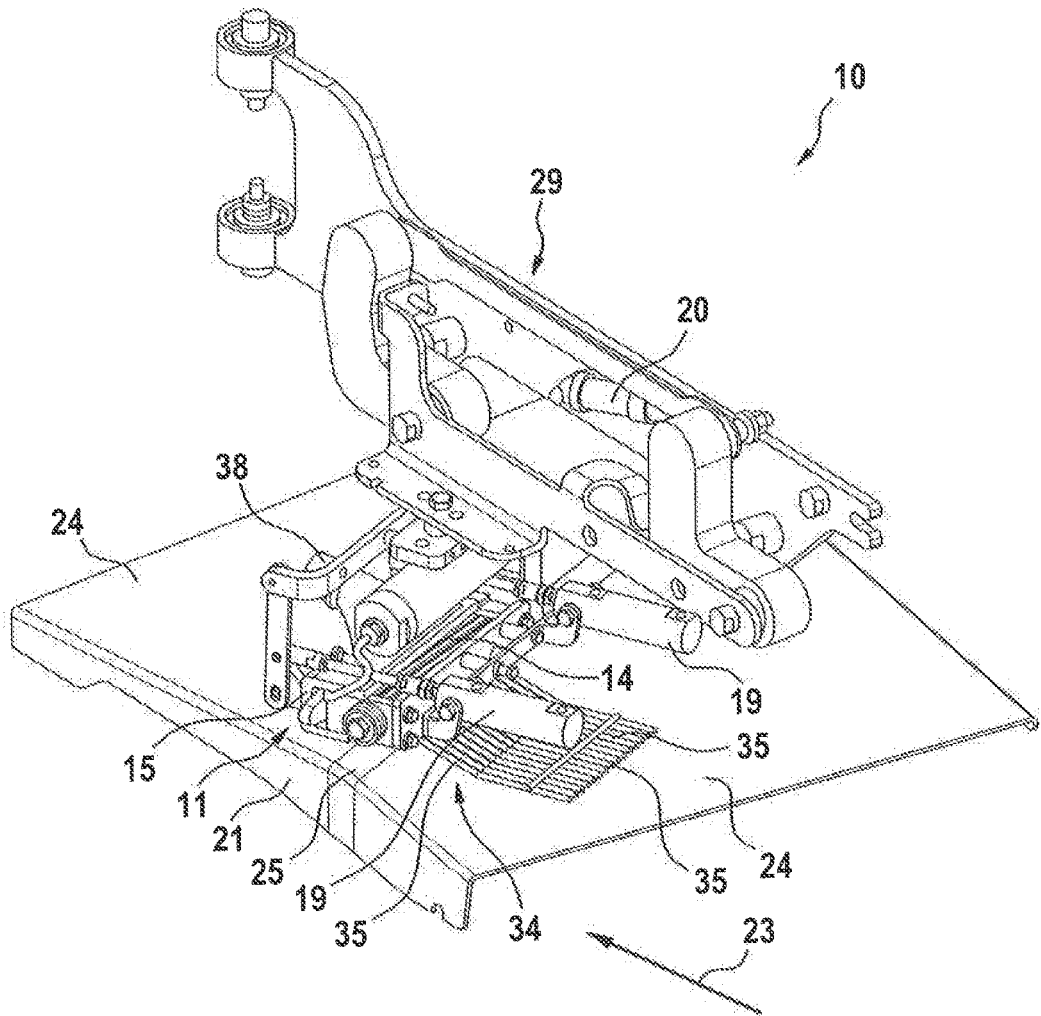
FIG. 1 a perspective view of the apparatus according to the invention from a first viewing direction, FIG. 2 a perspective view of the apparatus according to the invention from a second viewing direction, FIG. 3 a schematic diagram of the apparatus according to the invention in lateral view, FIG. 4 a detailed view of the apparatus according to the invention with the counter-bearing element in clamping position, FIG. 5 a detailed view of the apparatus according to the invention with the counter-bearing element in cleaning position, FIG. 6 a detailed view of the apparatus according to the invention in lowered position, FIG. 7 a detailed view of the apparatus according to the invention in raised position, FIG. 8 a further detailed view of the apparatus according to the invention with the counter-bearing element in clamping position, FIG. 9 a further detailed view of the apparatus according to the invention with the counter-bearing element in cleaning position, and FIG. 10 the detailed view shown in FIG. 8 viewed from below.
Figure 2:
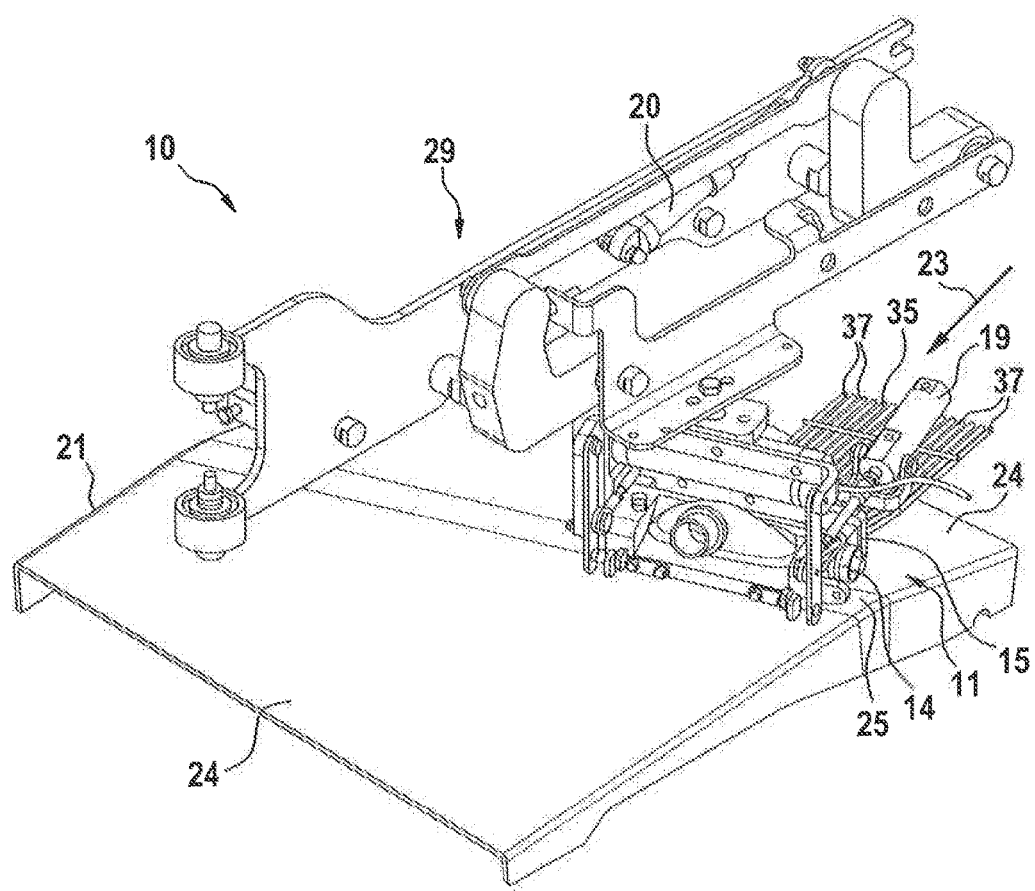
Figure 3:
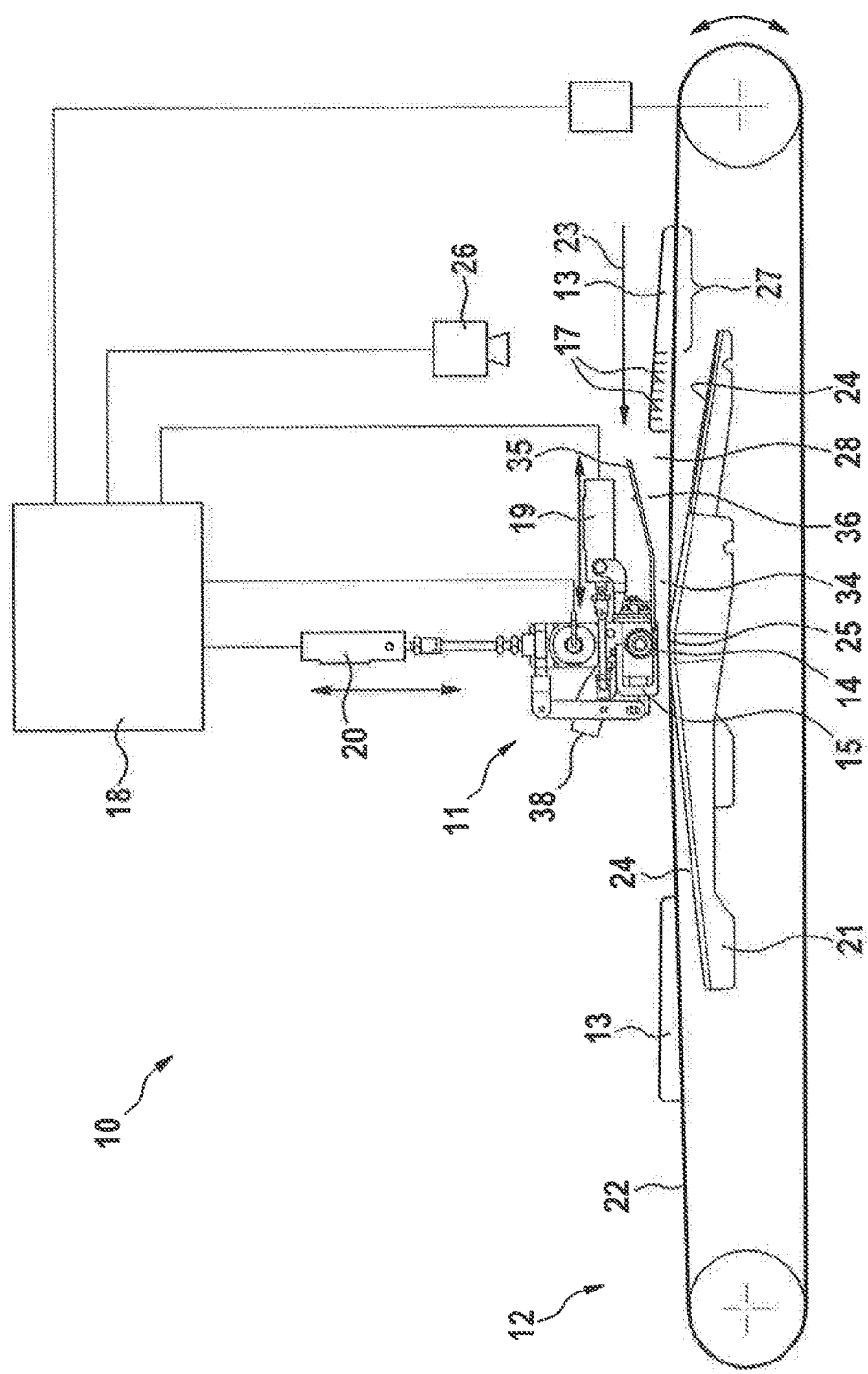

FIG. 1 shows a perspective view of the apparatus according to the invention from a first viewing direction. The present invention comprises an apparatus 10 which is designed and configured for removing pin bones from fish fillets 13. The apparatus 10 shown comprises at least one pin bone removal device 11. As can be seen from the schematic representation in FIG. 3, the apparatus according to the invention comprises a conveying device 12 which is designed and configured to convey the fish fillets 13 past the at least one pin bone removal device 11. For the sake of clarity, only one of the pin bone removal devices 11 is shown in the drawing. Preferably, however, a plurality of the pin bone removal devices 11 are arranged side by side above the conveying device 12 so that a plurality of the fish fillets 13 can be handled or processed in parallel. In this case, the conveying device 12 has a corresponding width in order to convey a plurality of the fish fillets 13 lying side by side in parallel.

The pin bone removal device 11 comprises a rotationally driven profiled roller 14 which with a counter-bearing element 15 forms a clamping gap 16. The roller 14 and the counter-bearing element 15 are designed to grasp the pin bones 17 in the clamping gap 16 by clamping and to remove said bones from the fish fillets 13 by applying tensile force. In other words, the pin bones 17, protruding from the fish fillet 13 or that are seizable due to the pressure of the pin bone removal device 11, arrive in the clamping gap 16 and are grasped by way of the rotationally driven profiled roller 14 and pulled out of the fish fillets 13. Advantageously, the counter-bearing element 15 and the roller 14 are designed to be controllably moved with respect to each other by control 18. In this way, the width of the clamping gap 16 can be adjusted arbitrarily during operation of the apparatus 10 according to the invention.

The sequence of the method according to the invention is therefore as follows: To remove the pin bones 17 from the fish fillets 13, said fish fillets are conveyed past at least one of the pin bone removal devices 11 by way of the conveying device 12. The pin bones 17 are grasped by clamping by way of the pin bone removal device 11 by holding them in the clamping gap 16. When the pin bones 17 enter the clamping gap 16, which is formed by the rotationally driven profiled roller 14 and the counter-bearing element 15, a tensile force is applied to the pin bones 17 and they are thus removed from the fish fillets 13. The method according to the invention is characterised in particular in that the counter-bearing element 15 and the roller 14 are moved with respect to each other by the control 18.

The control 18 preferably comprise a control device with at least one actuator 19. The control device or the control 18 is or are designed to move the counter-bearing element 15 and the roller 14 with respect to each other by way of the at least one actuator 19 from a clamping position to a cleaning position and vice versa.

Figure 4:
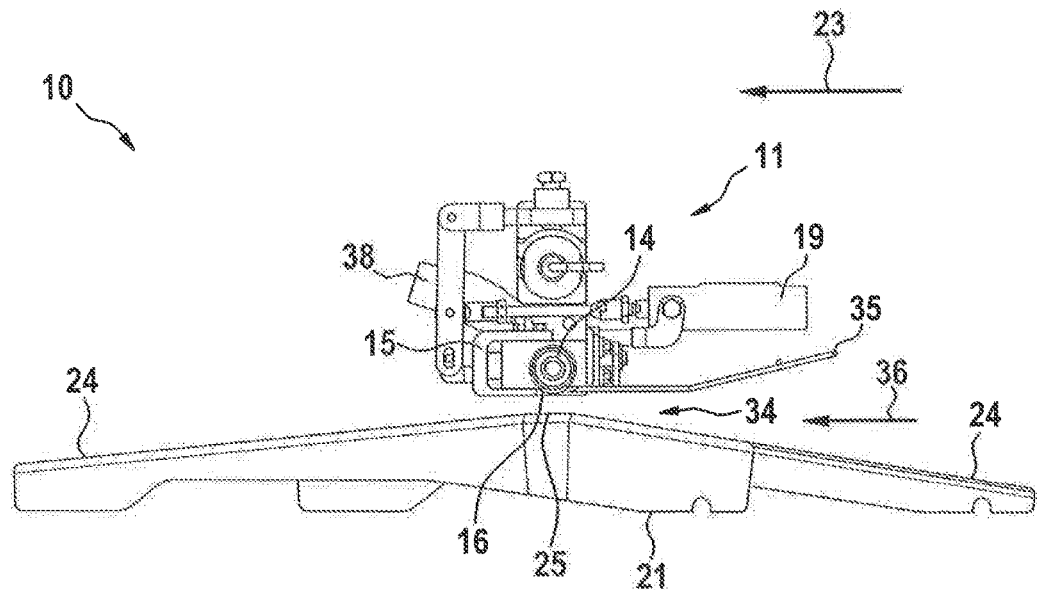
Figure 5:
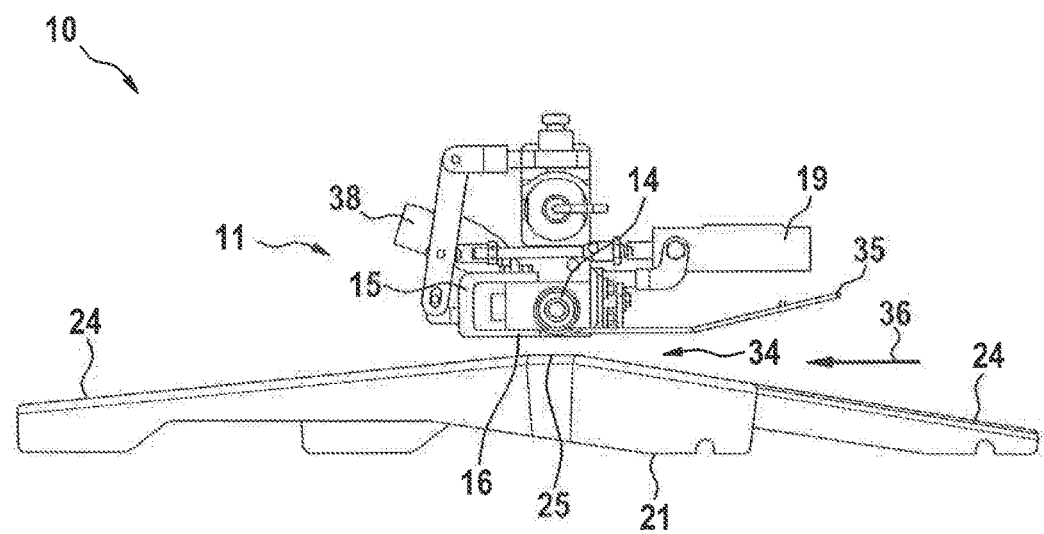
Figure 8:
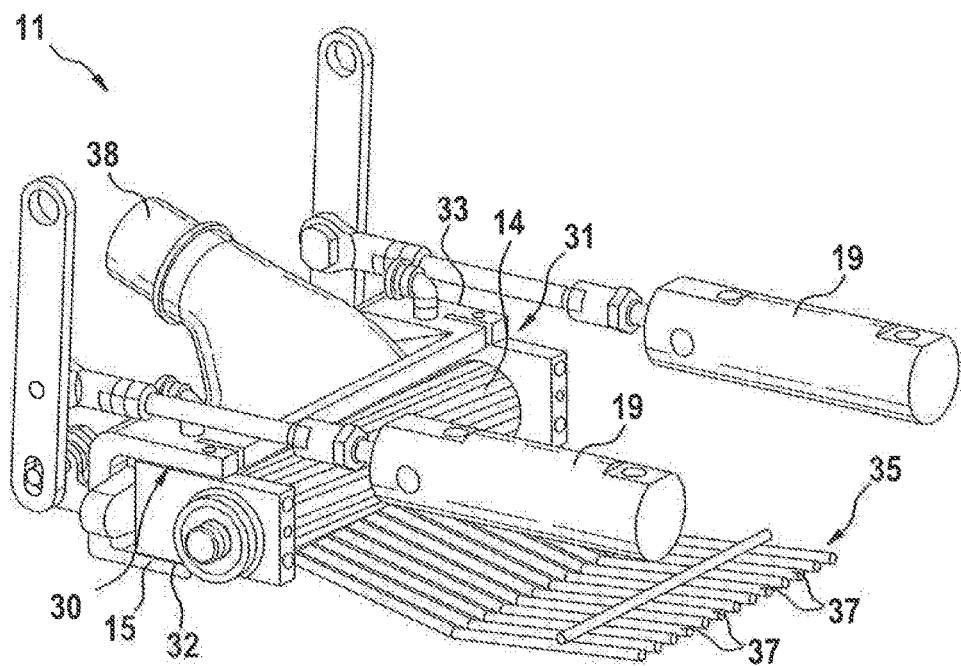
Figure 9:
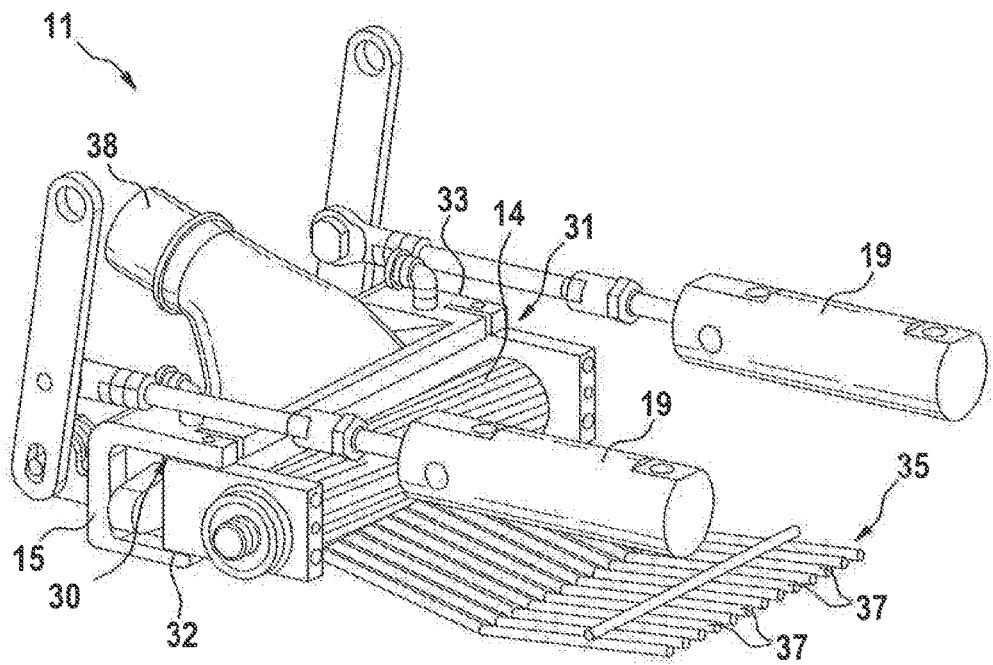

The clamping position is shown in FIGS. 4 and 8, while FIGS. 5 and 9 each illustrate the cleaning position. Moving of the counter-bearing element 15 with respect to the roller 14 from the clamping position to the cleaning position takes place by expanding the clamping gap 16. The respective one of the actuators 19 is in operative connection with the counter-bearing element 15. It should be noted that the drawing only shows one possible embodiment of the present invention by way of example, in which the counter-bearing element 15 is designed to be movable by way of the actuator 19. In contrast, the rotationally driven profiled roller 14 is substantially fixed.

Alternatively, it is possible for the counter-bearing element 15 to be fixed in relation to the apparatus 10, while the roller 14 is designed to be movable in its position with respect to the counter-bearing element 15 by way of the actuator 19. According to a further advantageous embodiment of the invention, which is not shown in the drawing, both the counter-bearing element 15 and also the roller 14 are designed to be controllably moved.

Figure 6:
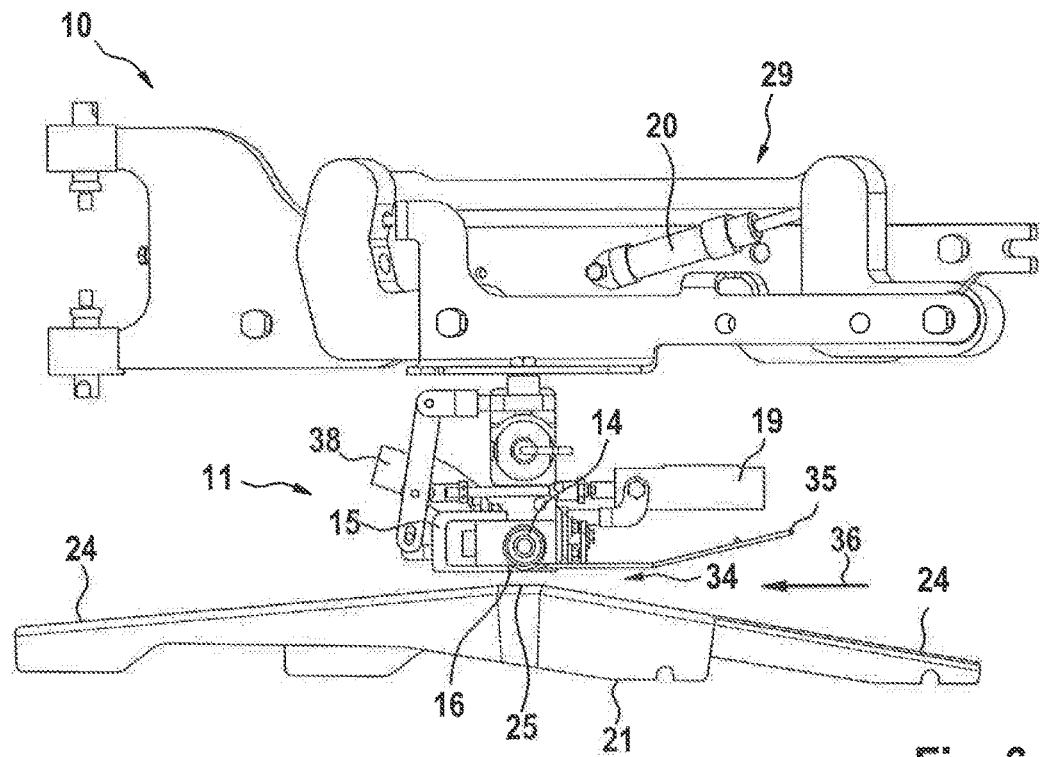
Figure 7:
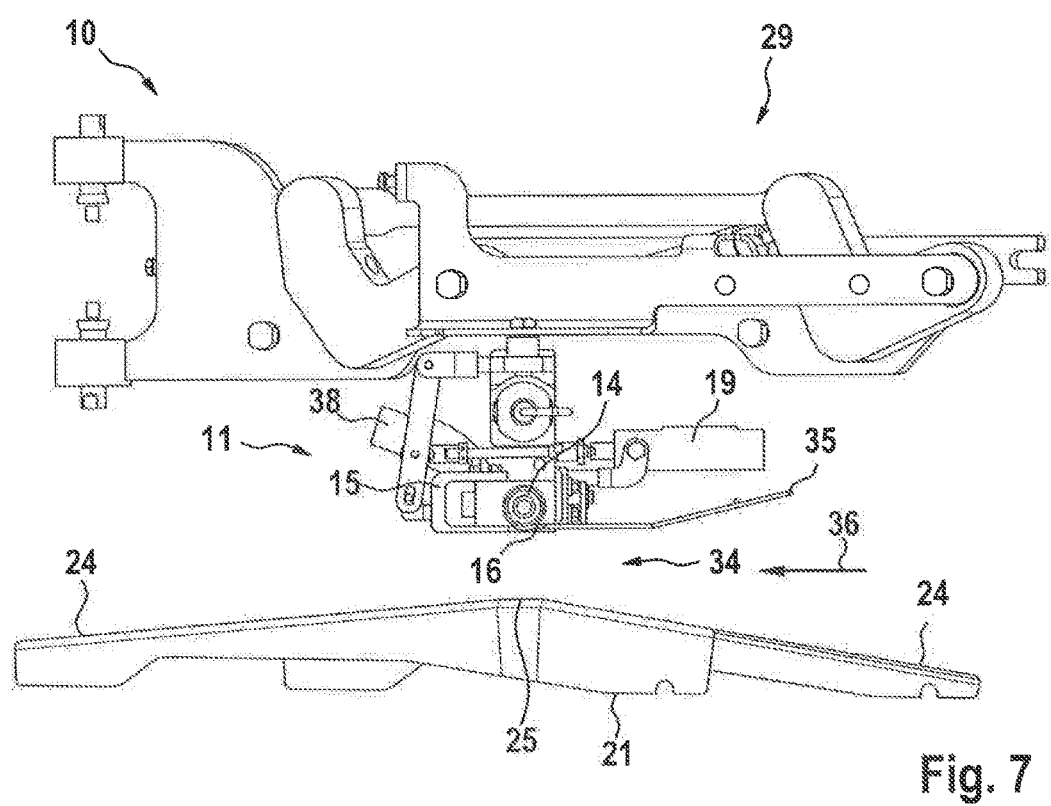

The pin bone removal device 11 is preferably designed to be controllably moved with respect to the conveying device 12 by way of at least one further actuator 20. In this way, it is possible to lower the pin bone removal device 11 in the direction of the conveying device 12 or to raise it in relation to the conveying device 12. The corresponding positions are shown in the detailed views of FIGS. 6 and 7 respectively. FIG. 6 shows the apparatus according to the invention in a lowered position, while FIG. 7 show the apparatus according to the invention in a raised position. In the lowered position, the pin bone removal device 11 is in any case lowered so far in the direction of the conveying device 12 by way of the further actuator 20 that the pin bone removal device 11 comes into contact with the fish fillets 13, conveyed by way of the conveying device 12, to remove the pin bones 17. In contrast, in the raised position the pin bone removal device 11 comes free of the fish fillets 13 such that a self-cleaning effect is achieved due to the spatial distance between the pin bone removal device 11 and the conveying device 12.

As shown in FIGS. 1 to 7, the conveying device 12 preferably comprises a supporting element. The fish fillets 13 are conveyed by way of a conveyor belt 22—which for the sake of clarity is shown only in FIG. 3—in a conveying direction 23. The supporting element 21 is arranged below the conveying plane formed by the conveyor belt 22. Further preferably, the supporting element 21 is designed as a supporting table. The supporting element 21 preferably comprises inclined planes 24 in each case. The inclined planes 24 each merge into a supporting area 25 which is oriented horizontally or substantially horizontally.

The distance between the pin bone removal device 11 and the conveying device 12 is preferably designed to be adjustable. Thus, it is possible to freely adjust the smallest possible distance of the pin bone removal device 11 in the lowered position shown in FIG. 6. In this way, the apparatus 10 according to the invention can be flexibly adjusted to various processing situations and/or fish fillet types. The control 18 is further preferably designed to preset the aforementioned distance. This enables adjustment of the smallest distance between the pin bone removal device 11 and the conveying device 12 in the lowered position during ongoing operation.

The pin bone removal device 11 according to the invention is preferably arranged in an inclined position with respect to the conveying direction 23. In other words, the pin bone removal device 11 is not arranged at right angles to the conveying device 12 and the conveying direction 23 but rather is oriented obliquely. This offers the advantage that the tensile force acting on the pin bones 13 due to the roller 14 and the counter-bearing element 15 is also directed obliquely. In this way, the tensile force acts substantially in the growth direction of the pin bones 17 in the fish fillets 13, that is longitudinally axial with respect to the pin bones 17. As a result, this prevents transverse tensile forces on the pin bones 17, which forces are often responsible for causing the pin bones 17 to break off during removal and which would lead to incomplete removal of the pin bones 17 from the fish fillets 13.

According to a preferred embodiment of the invention, it is provided that the bearing force with which the pin bone removal device 11 acts on the fish fillets 13 is designed to be variably adjustable by the control 18. In this way, it is achieved that the roller 14 acts on the fish fillets 13 with a defined bearing force. The further actuator 20 fulfils a dual function for this purpose. On the one hand, the further actuator 20 is designed to move the pin bone removal device 11 in the vertical direction between the cleaning position and the lowered position. On the other hand, the further actuator 20 is designed in such a self-resetting way that this produces a defined bearing force on the fish fillets 13.

Further preferably, the control device with the control 18 comprises a position determination device 26 which is designed and configured for position determination of the fish fillets 13 conveyed past the pin bone removal device 11. The position determination device 26 is preferably designed as an optical sensor system, for example as a camera or a light barrier. The position data or position signals provided by the position determination device 26 are evaluated by the control for position determination. Alternatively, it is possible for the position determination device 26 to comprise an appropriate evaluation device in addition to the aforementioned sensor system. The evaluation are appropriately designed to evaluate the signals or data provided by the optical system for determining the position of the fish fillets 13 and thus to identify the corresponding position data or signals. In this case, the position determination device 26 supplies corresponding position data of the fish fillets 13 to the control 18 in which the position data of the fish fillets 13 are processed immediately.

Advantageously, the position determination device 26 is further designed to determine first points in time at which boneless areas 27 of the fish fillets 13 are conveyed past in the area of the clamping gap 16. Thus, information based on the first points in time is provided in the control 18 which indicates at what point in time one of the fish fillets 13 is located within the operating area of the pin bone removal device 11 and whether pin bones 17 are to be removed instantly or whether, if necessary, boneless areas are to pass through the pin bone removal device 11.

The position determination device 26 is preferably further designed to determine second points in time at which the area of the clamping gap 16 is free of fish fillets. In this way, non-occupied areas 28, that is areas free of fish fillets, are detected and referenced via the second points determined.

The position determination device 26 is preferably designed to cause the control 18 to transfer the counter-bearing element 15 to the cleaning position within specified time intervals, at the first points in time and/or at the second points in time respectively. Transferring to the cleaning position is effected by the at least one actuator 19 which is appropriately activated for this purpose by the control 18. In this case, it is possible to move both the counter-bearing element 15 by way of the actuator 19 and also to move the roller 14 in relation to the counter-bearing element 15 by way of the actuator 19.

In other words, the control are designed to cause the cleaning position to be assumed in each case when boneless areas 27 or non-occupied areas 28 pass through. The different positions of the counter-bearing element 15 in the clamping position or in the cleaning position can be seen in particular from the detailed views according to FIG. 4 and FIG. 5. According to the embodiment shown there, the counter-bearing element 15 is designed and configured to be controllably moved by the actuator 19 arranged thereon. However, as mentioned at the outset, alternatively it is also possible to design the roller 14 to be controllably moved by the actuator 19, while the counter-bearing element 15 is fixed with respect to the pin bone removal device 11.

According to a further advantageous embodiment of the invention, which is not shown in the drawing, it is provided to design both the counter-bearing element 15 and also the roller 14 to be controllably moved in such a manner that in each case both are moved with respect to each other in order to be transferred from the clamping position to the cleaning position and vice versa. Advantageously, the position determination device 26 is further designed to cause the control 18 to temporarily enlarge the distance between the conveying device 12 and the pin bone removal device 11 by way of the at least one further actuator 20 within the specified time intervals, at the first points in time and/or at the second points in time respectively. Preferably, for this purpose the further actuator 20 is in operative connection with the pin bone removal device 11 such that said pin bone removal device 11 can be moved from a lowered position to a raised position and vice versa. Detailed views of the apparatus according to the invention in the lowered position and raised position are shown in FIGS. 6 and 7 respectively. The operative connection between the further actuator 20 and the pin bone removal device 11 is preferably established by way of a parallel rocker 29.

Alternatively, it is possible to arrange the further actuator 20 directly on the pin bone removal device 11.

Advantageously, the counter-bearing element 15 is evasively mounted by way of the at least one actuator 19 under application of a restoring force for clamping the pin bones 17. The actuator 19 therefore fulfils a dual function. On the one hand, the actuator 19 is designed to move the counter-bearing element 15 and the roller 14 with respect to each other. On the other hand, the actuator is designed in the manner of a spring element which acts on the counter-bearing element 15 with a restoring force directed in the direction of the roller 14. In this way, the counter-bearing element 15 is automatically pressed in the direction of the roller 14 and in this way the required clamping force is provided for clamping the pin bones 17. The control 18 are preferably designed such that the minimum width of the clamping gap 16 can be preset via them. In this way, the width of the clamping gap 16 can be adjusted in each case to the fish fillets 13 to be processed with the result that an optimum removal of the pin bones 17 is always ensured.

Further preferably, the magnitude of the restoring force applied by the control 18 is designed and configured to be variably adjustable. Thus the clamping force acting on the pin bones 17 located in the clamping gap 16 can also be optimally adjusted to the conditions of the fish fillets 13 to be processed.

The further detailed views according to FIGS. 8 and 9 show the apparatus according to the invention with the counter-bearing element 15 in the clamping position and cleaning position respectively. As shown in FIGS. 8 and 9, the counter-bearing element 15 is preferably mounted in a floating manner. The counter-bearing element 15 is therefore mounted in such a way that, on clamping the pin bones 17 in the clamping gap 16, not only does it yield in parallel displacement with respect to the rotational axis of the roller 14, but if need be it also allows for a certain oblique orientation. In this way, for example, it is possible to apply a substantially constant clamping force to pin bones 17 of differing thickness over the width of the roller 14. The counter-bearing element 15 is preferably mounted with its peripheral areas 32, 33 forming sliding guides 30, 31 respectively.

Figure 10:
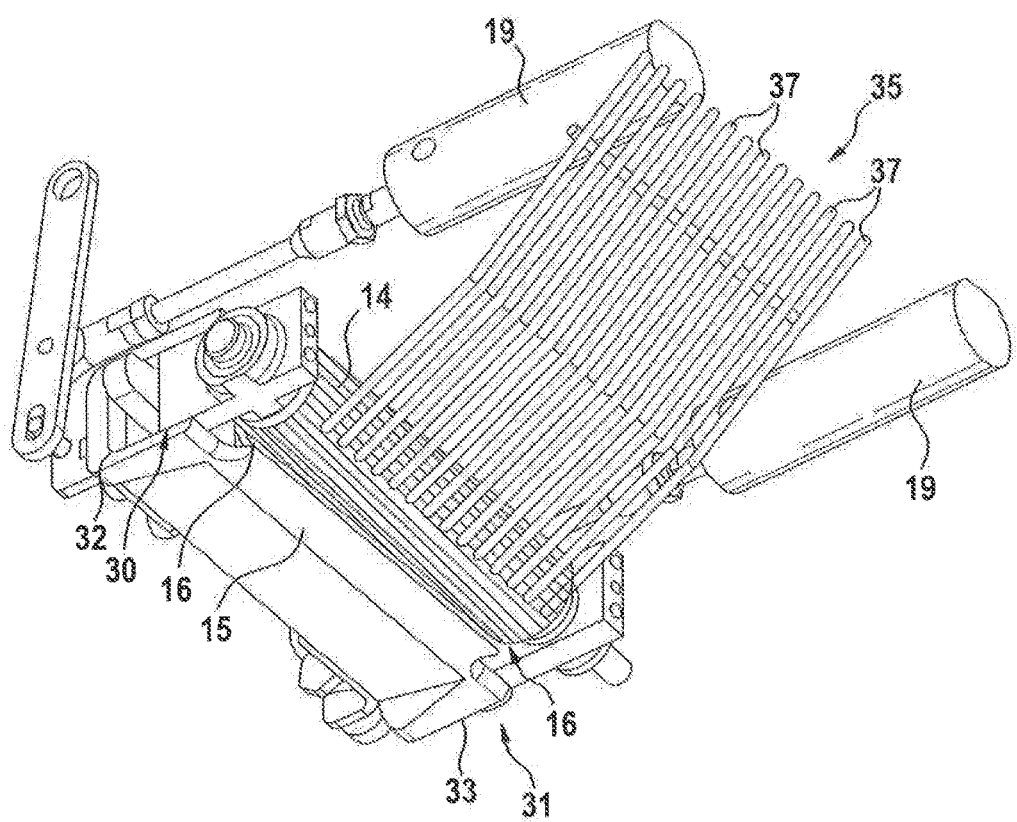

A holding-down clamp 35 is preferably arranged in the entry area 34 of the fish fillets 13 to the pin bone removal device 11. The holding-down clamp 35 together with the feed-side inclined plane 24 forms a feed hopper 36. The holding-down clamp 35 is preferably formed from a plurality of rod-shaped elements 37. The rod-shaped elements 37 are arranged in the manner of a grid. Reference is made to FIG. 10 for the further construction of the holding-down clamp 35 which shows the detailed view of the apparatus according to the invention shown in FIG. 8 viewed from below.

Further preferably, the pin bone removal device 11 according to the invention comprises a suction device 38 by way of which the removed pin bones 17 are sucked away. Furthermore, a flushing device—not shown in the drawing—can be provided in the area of the roller 14 or the counter-bearing element 15, by way of which an additional cleaning effect of the roller 14 or the counter-bearing element 15 can be achieved by flushing using flushing fluid. The flushing device is preferably connected to the control 18 such that a cleaning process is brought about by flushing using the flushing device, in particular in the raised position and/or in the cleaning position. Air or compressed air is further preferably used as the flushing medium.

Advantageously, the rotational speed of the roller 14 is temporarily increased in the cleaning position in order to remove contamination and bones under the effect of centrifugal force. Further preferably, a temporary reversal of the direction of rotation is provided for this purpose.

The invention claimed is:
1. An apparatus for removing pin bones from fish fillets, comprising
at least one pin bone removal device; and a conveying device configured to convey the fish fillets past the at least one pin bone removal device;

said at least one pin bone removal device comprising:
  a rotationally driven profiled roller;
  a counter-bearing element;
  a clamping gap formed between the rotationally driven profiled roller and the counter-bearing element; and
  a control configured to control a relative movement between the rotationally driven profiled roller and the counter-bearing element, wherein the at least one pin bone removal device is configured to grasp and remove the pin bones via tensile force from the fish fillets in the clamping gap between the rotationally driven profiled roller and the counter-bearing element.

2. The apparatus of claim 1, wherein the control is configured to control the movement of the rotationally driven profiled roller relative to the counter-bearing element.

3. The apparatus of claim 1, wherein the control is configured to control the movement of the counter-bearing element relative to the rotationally driven profiled roller.

4. The apparatus of claim 1, wherein the control comprises:
  a controller; and
  at least one actuator configured to change a spacing of the clamping gap between a clamping position and a cleaning position and vice versa.

5. The apparatus of claim 1, wherein the at least one pin bone removal device is configured to move with respect to the conveying device via at least one actuator.

6. The apparatus of claim 1, wherein one of:
  the at least one pin bone removal device is adjustably movable relative to the conveying device; or
  a spacing between the at least one pin bone removal device and the conveying device is adjustable.

7. The apparatus of claim 1, wherein the at least one pin bone removal device is configured to act on the fish fillets via a variably adjustable bearing force.

8. The apparatus of claim 1, further comprising a position determination device configured to determine a position of the fish fillets while being conveyed past the at least one pin bone removal device.

9. The apparatus of claim 8, wherein the position determination device is adapted to determine first points in time at which boneless areas of the fish fillets are conveyed past in an area of the clamping gap.

10. The apparatus of claim 9, wherein the position determination device is adapted to determine second points in time at which the area of the clamping gap is free of fish fillets.

11. The apparatus of claim 10, wherein the position determination device is coupled to the control.

12. The apparatus of claim 1, further comprising a position determination device coupled to the control and said control is configured to temporarily change a distance between the conveying device and the at least one pin bone removal device via at least one actuator within specified time intervals.

13. The apparatus of claim 1, wherein the counter-bearing element is movable via at least one actuator under application of a restoring force or variably adjustable restoring force.

14. The apparatus of claim 1, wherein the counter-bearing element is mounted in a floating manner.

15. A method for removing pin bones from fish fillets, comprising conveying the fish fillets on a conveying device past at least one pin bone removal device;

grasping the pin bones in a clamping gap of the at least one pin bone removal device, said clamping gap being formed by a rotationally driven profiled roller and a counter-bearing element;

applying a tensile force to the pin bones to remove said pin bones from the fish fillets; and controlling, via a control, a relative movement between the counter-bearing element and the rotationally driven profiled roller.

16. The method of claim 15, wherein the control activates at least one actuator to cause the relative movement, whereby the clamping gap changes from a clamping position to a cleaning position or vice versa.

17. The method of claim 15, wherein the control activates at least one actuator to cause a relative movement between the at least one pin bone removal device and the conveying device.

18. The method of claim 17, wherein the control is configured to preset a distance between the at least one pin bone removal device and the conveying device.

19. The method of claim 15, wherein the at least one pin bone removal device is configured to apply a variable bearing force on the fish fillets.

20. The method of claim 15, further comprising determining, via a position determination device, a position of the fish fillets conveyed past the at least one pin bone removal device.

21. The method of claim 20, wherein the position determination device is adapted to determine first points in time at which boneless areas of the fish fillets are conveyed past in an area of the clamping gap.

22. The method of claim 20, wherein the position determination device is adapted to determine second points in time at which the area of the clamping gap is free of fish fillets.

23. The method of claim 22, wherein the position determination device is coupled to the control.

24. The method of claim 15, wherein a position determination device is coupled to the control and said control is configured to temporarily change a distance between the conveying device and the at least one pin bone removal device via at least one actuator within specified time intervals.

25. The method of claim 15, wherein the counter-bearing element is one of:
  movable via at least one actuator under application of a restoring force or variably adjustable restoring force; or
  mounted in a floating manner.

26. An apparatus for removing pin bones from fish fillets, comprising
  at least one pin bone removal device capable of assuming a clamping position and a cleaning position;
  a conveying device configured to convey the fish fillets to a position underneath the at least one pin bone removal device;
  said at least one pin bone removal device comprising:
    a rotationally driven profiled roller;
    a counter-bearing element;
    a control; and
    at least one actuator coupled to the control and configured to cause a relative movement between the rotationally driven profiled roller and the counter-bearing element,
  wherein the at least one pin bone removal device is configured to grasp the pin bones in a clamping gap formed between the rotationally driven profiled roller and the counter-bearing element and remove the pin bones from the fish filets via tensile force while the fish filets are arranged on the conveying device.

* * * * *

UNITED STATES PATENT AND TRADEMARK OFFICE
CERTIFICATE OF CORRECTION

| | |
|---|---|
| PATENT NO. | : 10,548,331 B2 |
| APPLICATION NO. | : 16/312472 |
| DATED | : February 4, 2020 |
| INVENTOR(S) | : Torsten Rusko |

It is certified that error appears in the above-identified patent and that said Letters Patent is hereby corrected as shown below:

On the Title Page

Column 1, items (71) Applicant which reads:
"(71) Applicant:   NORDISCHER MASCHINENBAU RUD. BAADER GMBH + CO. KG,
Luebeck (DE)"

Should read:
-- "(71) Applicant:   NORDISCHER MASCHINENBAU RUD. BAADER GMBH + CO. KG,
Lübeck (DE)" --

Signed and Sealed this
Eleventh Day of August, 2020

Andrei Iancu
*Director of the United States Patent and Trademark Office*